Feb. 28, 1967   J. H. COWLES   3,306,682
SEAL FOR A ROLLER BEARING HAVING THIN WALLED RACE
Filed Dec. 10, 1963

INVENTOR
JOHN H. COWLES
BY
ATTORNEYS

United States Patent Office 3,306,682
Patented Feb. 28, 1967

3,306,682
SEAL FOR A ROLLER BEARING HAVING
THIN WALLED RACE
John H. Cowles, Forestville, Conn., assignor to The Torrington Company, Torrington, Conn., a corporation of Maine
Filed Dec. 10, 1963, Ser. No. 329,555
3 Claims. (Cl. 308—187.2)

This invention relates in general to new and useful improvements in roller bearings, and more particularly to a roller bearing of the thin walled race type having incorporated as part thereof a seal.

The sealing of roller bearings of the thin walled race type has presented a problem not encountered in other types of bearings. In the first place, ball bearings and many roller bearings are provided with not only outer races, but also inner races. In such bearing constructions, the inner races form seals with the associated shafts and therefore it is only necessary to provide seals between the inner and outer races of each bearing. This, however, is not true with respect to roller bearings of the thin walled race type wherein the rollers thereof ride directly upon the shaft which functions as the inner race of the bearing. Therefore, it is necessary that a seal for roller bearings of this type be of the shaft riding type.

A further problem of providing a suitable seal for a roller bearing of the thin walled race type results from the fact that the bearing race must be pressed tightly within a bore in a housing in order that the thin walled race may be straightened and made round. In the seating of the bearing race within the housing, it is necessary to press on one end of the bearing race and, therefore, it is necessary that the side flange of the bearing race at that one end have a flush surface against which a tool may be engaged. This factor, together with the fact that roller bearings of the thin walled race type are very thin and very small available space is provided between an associated shaft and housing for a seal, makes it extremely difficult to provide an effective seal for such bearings.

In view of the foregoing, it is the primary object of this invention to provide a roller bearing of the type including a thin walled outer race wherein the bearing race has incorporated therein a seal which is of the shaft riding type whereby an effective seal between the bearing race and the associated shaft may be obtained.

Another object of this invention is to provide for use in roller bearings a thin walled bearing race which has a flange at one end thereof particularly configurated for the reception of a seal, the seal being suitably adhered to the bearing shell and including a thin lip which is adapted to be flexed by engagement with a shaft and to form a seal with a rotating shaft.

A further object of this invention is to provide a thin wall bearing race for use in roller bearings wherein the bearing race is of a configuration capable of providing for the necessary bearing functions thereof and at the same time the bearing race is so configurated at one end thereof whereby suitable space is provided for a shaft riding seal, and the seal is suitably permanently adhered to the bearing race.

Another object of this invention is to provide a roller bearing of the type having a thin walled race wherein the bearing race is provided at the end thereof intended to be disposed at the outer end of a bore with an annular recess of a size permitting the mounting of an annular shaft riding seal therein with the seal being disposed entirely within the recess whereby when the bearing is pressed into a bore in a housing, a tool utilized in the pressing of the bearing into the bore may be fully seated on the end of the bearing race without in any way disturbing the seal carried by the bearing race.

Another object of this invention is to provide a thin walled bearing race for use in roller bearings with a seal of the shaft riding type, the seal being mounted at one end of the bearing race and including a thin lip which may be flexed by engagement with a shaft and which lip may be readily flexed in opposite directions whereby the lip is flexed in accordance with the direction in which the shaft is passed through the bearing race.

A still further object of this invention is to provide a novel thin bearing race for roller bearings wherein that end of the bearing race which is adapted to be disposed within the outer end of an associated housing bore is particularly configurated for the reception of a seal while the configuration of the bearing race remains such to accomplish the necessary co-action with rollers of the bearing, and the bearing race may be pressed within a bore in a housing in the conventional manner without the seal in any way interfering with the positioning of the bearing race within the housing and while permitting the seal to perform its shaft riding sealing function.

With the above and other objects in view that will hereinafter appear, the nature of the invention will be more clearly understood by reference to the following detailed description, the appended claims and the several views illustrated in the accompanying drawing.

Figure 1:
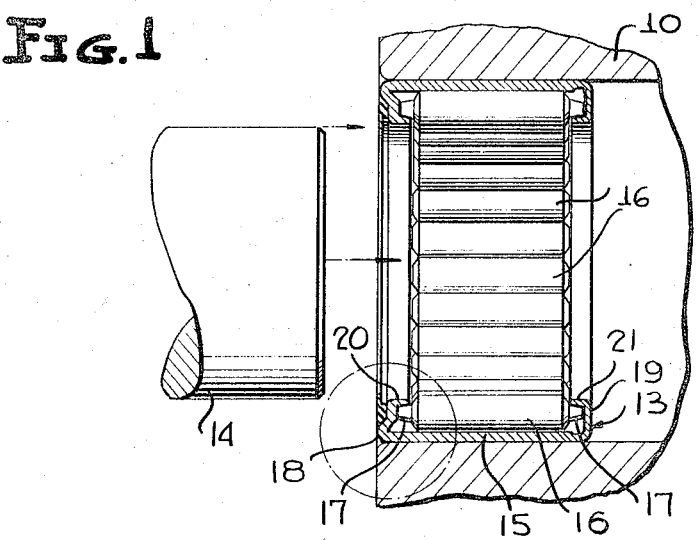
FIGURE 1 is a fragmentary sectional view taken through a housing in which there is mounted a full complement bearing having a thin walled bearing race in accordance with this invention, there also being shown a shaft about to be positioned within the bearing.

Referring now to the drawing in detail, it will be seen that there is illustrated in FIGURE 1 a housing 10 having a bore 11 therethrough. A roller bearing, generally referred to by the numeral 13 and incorporating the spirit of this invention, is illustrated as being positioned within the bore 11. A shaft, which is intended to be rotatably journalled within the bearing 13 and which is referred to by the numeral 14, is illustrated generally within the housing 10 and prior to the positioning thereof within the bearing 13.

The illustrated bearing 13 is of the full complement type and includes a thin walled bearing race 15 which is preferably of a drawn sheet metal construction although it could feasibly be formed by a machining operation. However, irrespective of how the bearing race 15 is formed, it will be readily apparent that it is relatively thin. The bearing race 15 has positioned therein a plurality of rollers 16 which are disposed in side-by-side parallel touching relation. Each roller 16 has a reduced end portion 17 at each end thereof and axial movement of the rollers 16 is restricted by a pair of flanges 18 and 19. The flanges 18 and 19 terminate in opposed lips 20 and 21, respectively, which also serve to retain the rollers 16 within the bearing race 15.

Figure 2:
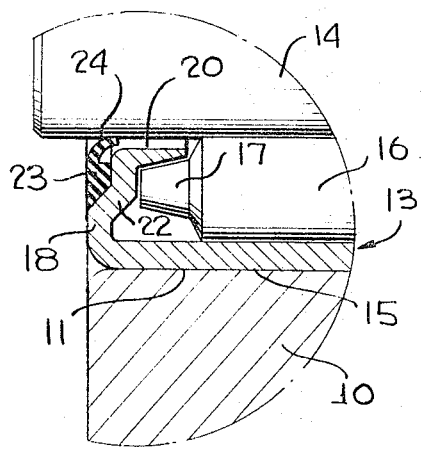
FIGURE 2 is an enlarged fragmentary sectional view showing more specifically the circled portions of the bearing and housing assembly of FIGURE 1 and with the shaft in position within the bearing, the shaft having been positioned within the bearing from left to right.
Figure 3:
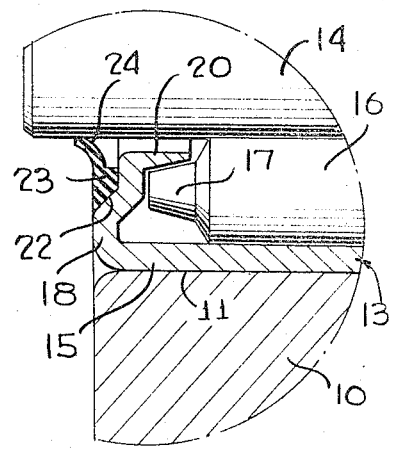
FIGURE 3 is an enlarged fragmentary vertical sectional view similar to FIGURE 2 and shows the seal as it would appear when the shaft is positioned within the bearing from right to left.

Referring to FIGURES 2 and 3, it will be seen that the flange 18 is particularly configured so as to define an annular recess 22. A small seal 23 is seated within the recess 22, the seal 23 being of the shaft riding type and being angular in outline. The seal 23 includes a thin lip 24 which is directly engageable with the shaft 14. It will be readily apparent that the recess 22 is of a size for the seal 23 to be fully recessed therein as far as the axial dimensions of the seal 23 are concerned. On the other hand, the lip 24 projects radially inwardly out of the recess 22 and is deflected in its engagement with the shaft 14.

Reference is now made to FIGURE 1 where it will be seen that although the seal 23 is carried by the side flange 18, since the seal 23 is fully disposed within the recess 22, it in no way interferes with the proper positioning of the bearing race 15 within the bore 11. Despite the fact that the bearing race 15 is provided with a seal at that end thereof which is engaged by a tool in the normal mounting of the bearing 13 within the housing 10, the seal in no way interferes with the engagement of the bearing by a tool.

It is also to be noted that when the bearing 13 is initially positioned within the housing 10, the lip 24 of the seal 23 is disposed normal to the axis of the bearing 13. Since the lip 24 is of a reduced thickness as compared to the remainder of the seal 23, it may readily flex in a direction axially of the bearing. Accordingly, when the shaft 14 is inserted in the bearing 13, upon the engagement of the shaft 14 with the lip 24, the lip 24 is deflected in the direction of movement of the shaft 14 and assumes a shaft riding position. When the shaft 14 is positioned within the bearing 13 from left to right, the lip 24 is deflected to the right, as is shown in FIGURE 2. On the other hand, when the shaft 14 is positioned within the bearing 13 from right to left, the lip 24 is deflected to the left, as is shown in FIGURE 3. It will be apparent that in either position of the lip 24 an effective seal between the shaft 14 and the seal 23 is obtained. It will also be apparent that the existence of the seal 23 in no way effects the positioning of the shaft 14 within the bearing 13.

The manner in which the seal 23 may be secured within the recess 22 and to the flange 18 may be varied. In some cases, the seal is molded directly onto the bearing race, and in other cases the seal is adhesively secured to the bearing race by using a suitable adhesive.

Figure 4:
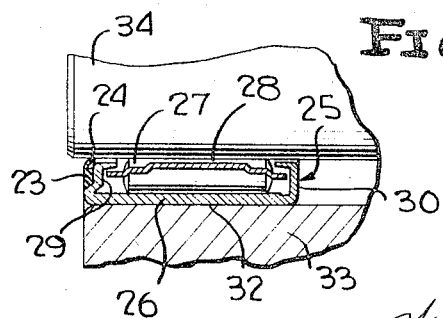
FIGURE 4 is a fragmentary sectional view taken through a housing in which there is mounted a roller bearing formed in accordance with this invention wherein the bearing is of the retainer type as opposed to the full complement type shown in FIGURES 1, 2 and 3.

Referring now to FIGURE 4 in particular, it will be seen that there is illustrated a slightly modified form of bearing which is generally referred to by the numeral 25. The bearing 25, as opposed to being a full complement bearing like the bearing 13, is a retainer type bearing. The bearing 25 includes a bearing race 26 which is of a thin wall construction. A plurality of rollers 27 are disposed in axis-parallel relation within the bearing race 26 and are retained in this relation and within the bearing race by means of a retainer 28. It is to be understood that the construction of the retainer 28 is conventional and therefore is not described in detail here.

The configuration of the bearing race 26 may differ slightly from that of the bearing race 15 in view of the fact that the bearing race 26 only indirectly retains the rollers 27 in place through the retainer 28 whereas the rollers 16 are particularly designed for direct engagement with the bearing race 15 and retention thereby. However, the bearing race 26 does have a pair of flanges at the opposite ends thereof which include an inner flange 29 and an outer flange 30. The inner flange 29 is configurated to define a recess 31, which corresponds to the recess 22. In the recess 31 there is received a seal 23 which, depending upon the configuration of the recess 31, may be identical to the seal 23 utilized with the bearing race 15.

The bearing 25 is positioned within a bore 32 of a housing 33 which may be the housing 10. A shaft 34, which may be identical with the shaft 14, is rotatably journalled within the bearing 25 and a seal between the bearing race 26 and the shaft 34 is formed by engagement of the lip 24 of the seal 23 with the shaft 34.

The advantages of the seal arrangement disclosed herein are believed to be obvious. It will be readily apparent that the relationship of the seal with respect to the bearing race is such that the bearing race may be properly seated within a housing without any interference whatsoever from the seal. At the same time, since the seal is bonded to the bearing race and is of the shaft riding type, it will be readily apparent that the necessary seal between a shaft and a housing at one end of the bearing is assured. In addition, it will be readily apparent that the construction of the seal is such that it in no way interferes with the positioning of the shaft within the bearing.

Although only a preferred embodiment of the seal construction has been specifically illustrated and disclosed herein, it is to be understood that minor variations may be made in the seal construction and its relationship to the bearing shell within the spirit and scope of this invention as defined by the appended claims.

I claim:

1. In a bearing race particularly adapted for use as a part of an anti-friction bearing of the roller and needle type, said bearing race being of thte thin wall drawn sheet metal type having radially inwardly directed flanges at opposite ends thereof, said bearing race being of the type which is tightly mounted within a housing bore by pressing and a particular one of said flanges always being the outer flange in an axial direction and being particularly adapted to receive a force necessary to press said bearing race into a housing bore, said outer flange having an outer portion in a radial direction for engagement by an installing tool: the improvement residing in an inner portion of said outer flange being axially inwardly bent and defining an annular seal receiving recess, and a shaft engageable seal carried by said outer flange, said seal being seated in said recess in axially recessed relation relative to the outer surface of said outer flange outer portion and projecting radially inwardly of said outer flange for sealing engagement with a shaft.

2. In a shaft assembly of the type including a housing, a bearing of the roller and needle type, and a shaft, said housing having a bearing receiving bore therein, said bearing including a bearing race and anti-friction rolling elements in rolling engagement with said bearing race and said shaft, said bearing race being of a drawn sheet metal construction having radially inwardly directed flanges at the opposite ends thereof, said bearing race having a press fit within said housing with one of said flanges being an outer flange in an axial direction and having an outer portion in a radial direction for engagement by an installing tool: the improvement residing in an inner portion of said outer flange being axially inwardly bent and defining an annular seal receiving recess, and a shaft engageable seal carried by said outer flange, said seal being seated in said recess in axially recessed relation relative to the outer surface of said outer flange outer portion and projecting radially inwardly of said outer flange for sealing engagement with said shaft.

3. A shaft assembly comprising a housing, a bearing of the roller type and a shaft; said housing having a bearing receiving bore therein, said bearing including a bearing race having at least one side flange, said bearing race being seated within said housing bore with said side flange being disposed outermost, said shaft having a portion thereon journalled in said bearing, and a seal carried by said side flange and riding on said shaft, said bearing race being formed of sheet metal and said side flange being axially inwardly bent to define an annular groove in the outer surface thereof, and said seal being seated in said groove in recessed relation.

References Cited by the Examiner

UNITED STATES PATENTS

| | | | |
|---|---|---|---|
| 2,114,908 | 4/1938 | Peterson | 277—182 X |
| 2,244,379 | 6/1941 | Warner | 64—17 |
| 2,274,137 | 2/1942 | Frauenthal | 277—181 X |
| 2,659,637 | 11/1953 | Barr | 308—216 X |
| 2,794,693 | 6/1957 | Burkhalter | 64—17 |
| 2,894,791 | 7/1959 | White | 308—217 X |
| 3,007,752 | 11/1961 | Gales | 308—187.2 |
| 3,284,145 | 11/1966 | Bikley | 308—187.2 |

FOREIGN PATENTS 878,279   9/1961   Great Britain.

MARTIN P. SCHWADRON, *Primary Examiner.*

DON A. WAITE, DAVID J. WILLIAMOWSKY, *Examiners.*

L. L. JOHNSON, *Assistant Examiner.*